United States Patent [19]

Takahashi et al.

[11] Patent Number: 5,237,242
[45] Date of Patent: Aug. 17, 1993

[54] APPARATUS FOR OPERATING A DISCHARGE LAMP AND A LIGHTING UNIT HAVING THE APPARATUS

[75] Inventors: Keiji Takahashi; Kazutoshi Mita, both of Kanagawa, Japan

[73] Assignee: Toshiba Lighting and Technology Corporation, Tokyo, Japan

[21] Appl. No.: 813,029

[22] Filed: Dec. 24, 1991

[30] Foreign Application Priority Data

Dec. 30, 1990 [JP] Japan ................................ 2-417880
Mar. 31, 1991 [JP] Japan .................................. 3-92898

[51] Int. Cl.$^5$ ..................... H05B 37/03; H05B 41/29
[52] U.S. Cl. .................................. 315/123; 315/119; 315/225
[58] Field of Search ............... 315/119, 121, 123, 125, 315/126, 127, 128, 209 R, 224, 225, 226, 307, 308, DIG. 5, DIG. 7

[56] References Cited

U.S. PATENT DOCUMENTS

| 4,503,363 | 3/1985 | Nilssen | 315/225 |
| 4,667,131 | 5/1987 | Nilssen | 315/225 X |
| 4,710,682 | 12/1987 | Zuchtriegel | 315/224 |
| 4,914,558 | 4/1990 | Flickinger | 363/17 |
| 4,926,096 | 5/1990 | Nilssen | 315/225 |
| 5,004,955 | 4/1991 | Nilssen | 315/127 X |
| 5,015,923 | 5/1991 | Nilssen | 315/209 R |
| 5,023,519 | 6/1991 | Nilssen | 315/219 X |
| 5,039,919 | 8/1991 | Nilssen | 315/219 X |

FOREIGN PATENT DOCUMENTS 2-144890 4/1990 Japan.
2224170 4/1990 United Kingdom.

Primary Examiner—David Mis
Attorney, Agent, or Firm—Cushman, Darby & Cushman

[57] ABSTRACT

Apparatus for operating a discharge lamp comprising a high frequency circuit, sensing means for sensing the absence of an electrical connection between the circuit and the lamp and control means for receiving a non-connection signal and for sending a decrease control signal to the high frequency circuit for decreasing the high frequency power supplied to the lamp in response to the non-connection signal. The sensing means senses the absence of an electrical connection between the circuit terminal to which an electric potential is applied which is less than that applied to the other circuit terminal. By sensing the electrical non-connection between the circuit terminal having the lower potential, it is not necessary to sense the absence of a connection at the other end of the lamp.

12 Claims, 5 Drawing Sheets

APPARATUS FOR OPERATING A DISCHARGE LAMP AND A LIGHTING UNIT HAVING THE APPARATUS

BACKGROUND OF THE INVENTION

1. Field of the Invention

The present invention relates generally to an apparatus for operating a discharge lamp, and more particularly, to an apparatus for reducing the chances that a person working on the lamp will receive an electrical shock.

2. Description of the Related Art

Many kinds of apparatus have been known for operating a discharge lamp with high frequency power. They are classified into two types. One type of apparatus uses an insulating transformer which insulates the input side from the output side. The other type does not use an insulating transformer and is called the "directly-connected power source" type.

The former type is usually effective in preventing a person who changes a lamp from receiving an electrical shock, even if the lamp is connected with a socket only at one side. However, it is generally a disadvantage that the insulating transformer is too large.

The directly connected power source type apparatus is smaller than the insulating transformer, but it is not as effective in preventing a person who changes a lamp from receiving an electrical shock when a lamp is connected with a socket only at one end. Such a directly connected apparatus permits a leakage current to flow through a floating capacitance to the person.

In order to reduce the likelihood of electrical shock, sensing means have been provided at both ends of the lamp for sensing the connection between the lamp and the apparatus and means for supplying high frequency power to the lamp becomes operative only when the lamp is connected with the apparatus at both ends of the lamp. However, regardless of whether the sensing means electrically senses current or voltage, or whether it senses mechanically, two sensing means are required to sense connections at both ends of the lamp, and therefore the sensing means is complex and expensive.

SUMMARY OF THE INVENTION

It is an object of the present invention to provide an apparatus for operating a discharge lamp, which reduces the possibility that a person working on the lamp could receive an electrical shock, by a comparatively simple structure and at a comparatively low price.

To accomplish the object described above, the present invention provides an apparatus for operating a discharge lamp having a pair of lamp terminals. A high frequency circuit has a first circuit terminal and a second circuit terminal which can be connected with the lamp terminals. The high frequency circuit supplies high frequency power to the lamp through the circuit terminals, with the AC amplitude of the electrical potential of the high frequency power applied to the first circuit terminal being less than that applied to the second circuit terminal. A sensing means senses the absence of an electrical connection between the first circuit terminal and one of the lamp terminals and generates a non-connection signal in response. Control means receives the non-connection signal and sends a decrease control signal to the high frequency circuit for decreasing the high frequency power supplied to the second circuit terminal in response to the non-connection signal.

BRIEF DESCRIPTION OF THE DRAWINGS

The present invention will be better understood with reference to accompanying drawings, wherein the same reference numerals throughout the various figures denote similar structural elements and in which.

DETAILED DESCRIPTION OF THE PREFERRED EMBODIMENTS

Preferred embodiments of the present invention will now be described in more detail with reference to the accompanying drawings.

Figure 1:
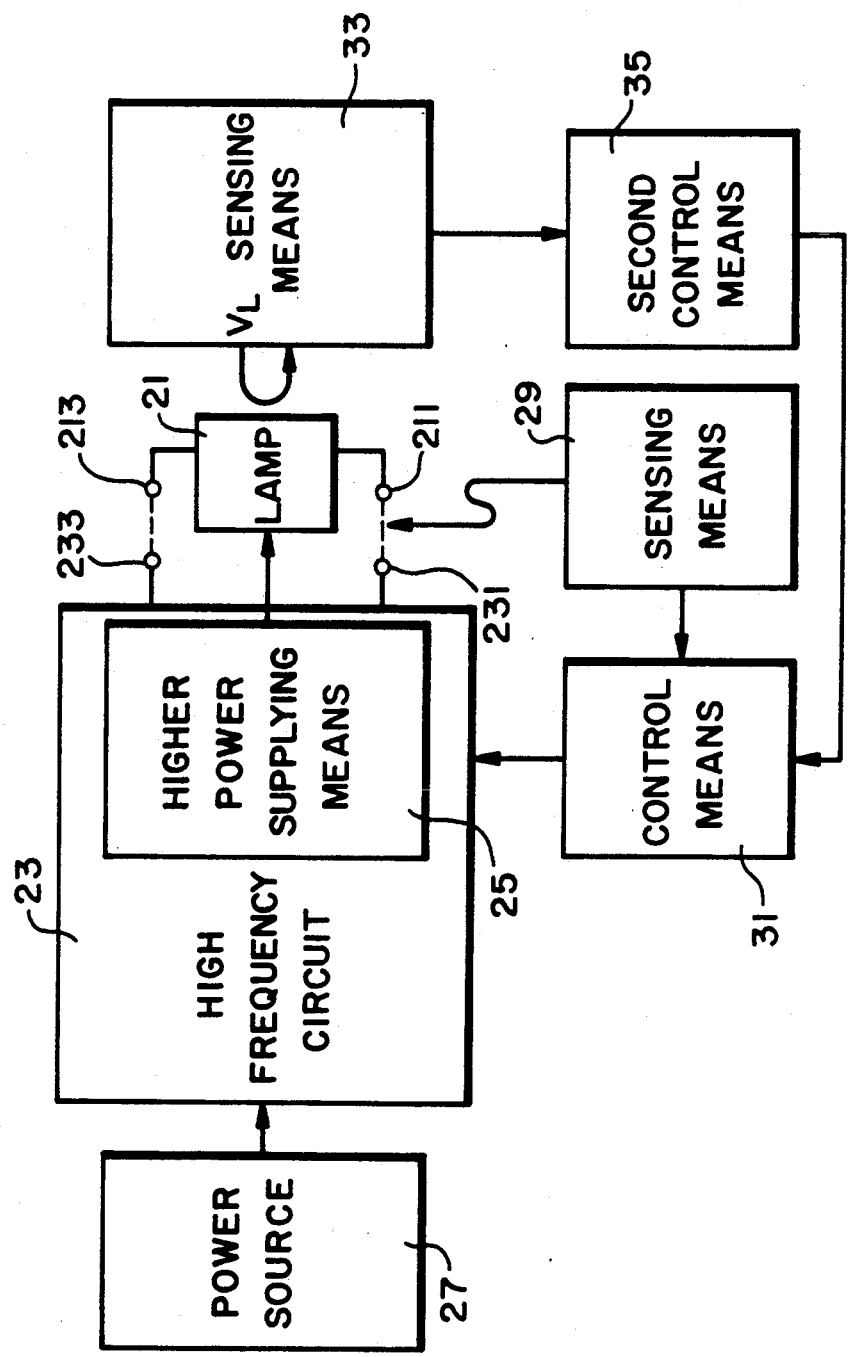
FIG. 1 is a block diagram of a first embodiment of the present invention.
Figure 2:
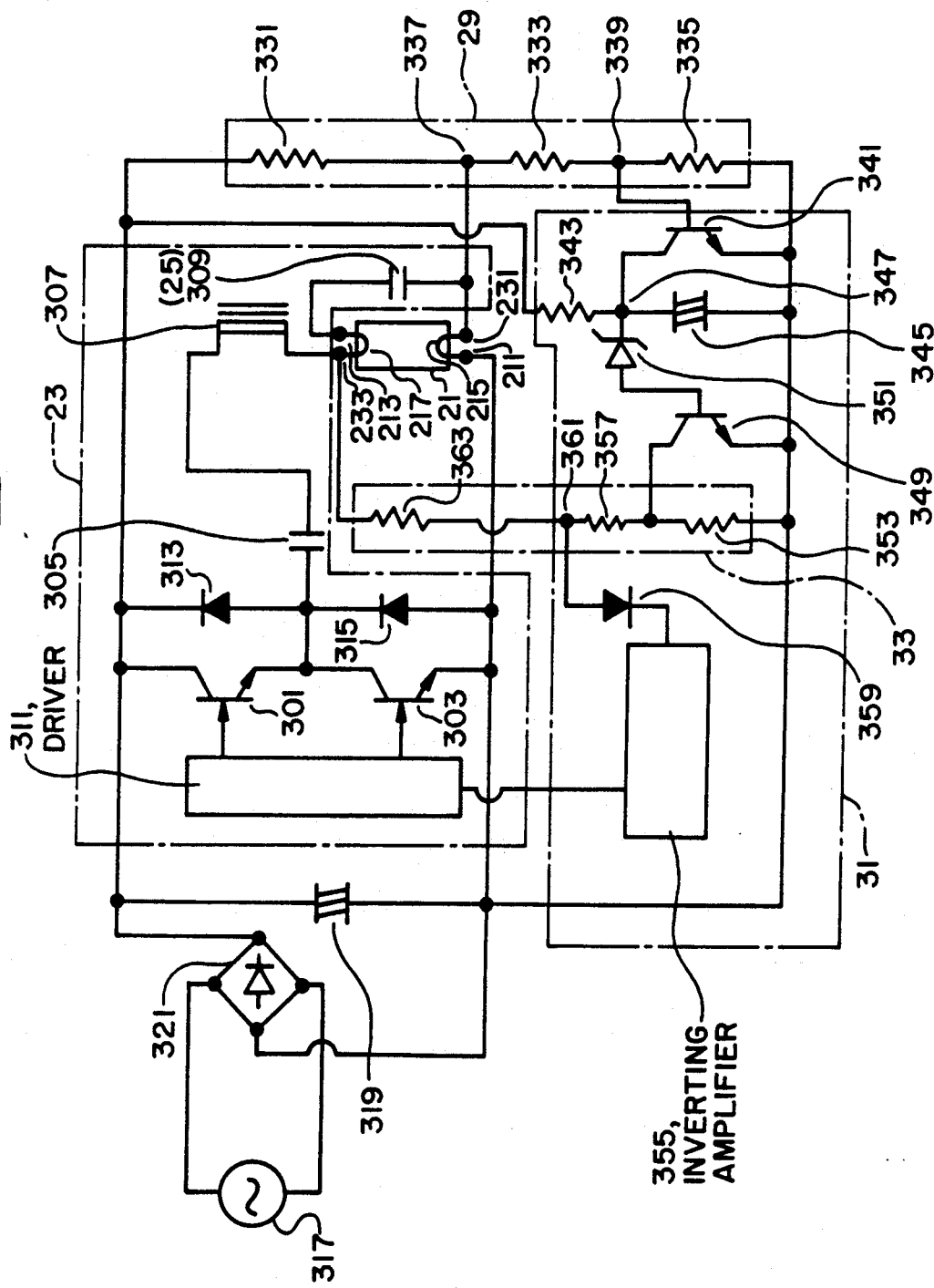
FIG. 2 is a circuit diagram of FIG. 1.

Referring now to FIGS. 1 and 2, a first embodiment of an apparatus for operating a discharge lamp 21 according to the present invention will be described. The apparatus has a high frequency circuit 23 for supplying high frequency power to lamp 21. The lamp has a pair of lamp terminals 211 and 213 and high frequency circuit 23 also has a pair of circuit terminals 231 and 233. When lamp 21 is to operate, first circuit terminal 231 and first lamp terminal 211 are connected and second circuit terminal 233 and second lamp terminal 213 are connected with one another, respectively. High frequency circuit 23 is a series-invertor controlled by an external circuit and supplies an unbalanced or unsymmetrical electric potential to lamp 21. In other words, the AC amplitude of the electric potential of first circuit terminal 231 is small and is less than that of second circuit terminal 233.

High frequency circuit 23 has a higher power supplying means 25 for supplying a higher power to lamp 21 only for a few seconds as it is being started. Higher power supplying means 25 helps lamp 21 start easily and therefore, it is not a necessary component of the present invention. High frequency circuit 23, is of course, connected with a power source 27.

The connection between first circuit terminal 231 and first lamp terminal 211 is detected or sensed by sensing means 29. When sensing means 29 detects that the connection is cut off, or in other words, when the sensing means 29 senses that lamp 21 is not connected with high frequency circuit 23, sensing means 29 generates a non-connection signal that first circuit terminal 231 is not connected with first lamp terminal 211 and sends the non-connection signal to a control means 31 which is connected with and between high frequency circuit 23 and sensing means 29 for the purpose of controlling high frequency circuit 23. When control means 31 receives the non-connection signal, control means 31 generates and sends a decrease control signal to high frequency circuit 23 to reduce the high frequency power which is supplied to lamp 21 through second circuit terminal 233.

This apparatus has a $V_L$ sensing means 33 for sensing whether the lamp voltage $V_L$ is adequate or too much and for generating a signal according to the lamp voltage $V_L$. The $V_L$ signal is sent to a second control means 35 which controls high frequency circuit 23 directly or indirectly (through control means 31) so that the high frequency power of high frequency circuit 23 decreases when the lamp voltage $V_L$ is too high. The block diagram of FIG. 1 and the functions described above are accomplished by the circuit shown in FIG. 2. A discharge lamp 21 and a high frequency circuit 23 are connected with one another. Discharge lamp 21 is a hot-cathode type fluorescent lamp having a pair of hot cathodes 215 and 217 at opposite ends. Therefore, the lamp has a pair of first lamp terminals 211 at the first end of lamp 21 and a pair of second lamp terminals 213 at the second end of lamp 21. Both lamp terminals 211 and 213 at each end are connected with each hot-cathode. High frequency circuit 23 has a pair of first circuit terminals 231 connected with the pair of first lamp terminals 211 and a pair of second circuit terminals 233 connected with the pair of second lamp terminals 213.

High frequency circuit 23 has a pair of transistors 301 and 303 which are connected with one another in series and which are elements of a series invertor driven by an external driver. The emitter of transistor 303 is connected with one of the first circuit terminals 231. The collector of transistor 303, which is an intermediate connection point between transistors 301 and 303, is connected with one of the second circuit terminals 233 through a condenser 305 and an inductor 307. The other of first circuit terminals 231 and the other of second circuit terminals 233 are connected with one another through a condenser 309 of higher power supply means 25. The bases of transistors 301 and 303 are connected with a driver 311 which switches transistors 301 and 303 alternately ON and OFF. The power that high frequency circuit 23 supplies to lamp 21 is variable according to the switching frequency of transistors 301 and 303 controlled by driver 311.

Condenser 305 and inductor 307 resonate and generate a high voltage which is supplied to lamp 21 through first circuit terminals 231 and second circuit terminals 233. Further during a starting period, before lamp 21 begins to discharge, condenser 309 is added to the resonance circuit of condenser 305 and inductor 307. Therefore, the resonance circuit of condenser 305, inductor 307 and condenser 309 generates and supplies a higher voltage than that during the period after lamp 21 begins to discharge. Condenser 39 supplies a preheat current, which is helpful in starting the discharge of lamp 21.

In this embodiment, high frequency circuit 23 has a pair of diodes 313 and 315 at each transistor 301 and 303 for bypassing the back electromotive forces when transistors 301 and 303 are turned off.

High frequency circuit 23 is connected with an AC power source 317 through a smoothing condenser 319 and a rectifier 321 which are elements of power source 27. It is important that first lamp terminals 211 and first circuit terminals 231 are directly and electrically connected with one of the terminals of rectifier 321, especially the terminal of rectifier 321 in this embodiment. Therefore, the AC amplitude of the electric potential of first circuit terminal 231 is small and is less than that of second circuit terminal 233 which is indirectly connected with the plus terminal of rectifier 321.

Sensing means 29, for sensing the electrical connection between first lamp terminals 211 and first circuit terminals 231, has three resistors 331, 333 and 335 in series. Resistors 333 and 335 are parallel to hot-cathode 215, and intermediate point 337, between resistor 331 and resistor 333, is connected with one of first circuit terminals 231.

When first lamp terminals 211 are connected with first circuit terminals 231, the voltage applied to hot-cathode 215 is almost zero. Therefore, the voltage applied to resistors 333 and 335 is also almost zero, and the electric potential of intermediate point 337 is almost zero. When first lamp terminals 211 are disconnected from first circuit terminals 231, the voltage of power source 27 is applied to resistors 331, 333 and 335. Therefore, the electric potential of intermediate point 339, between resistor 333 and resistor 335, becomes high and sensing means 29 sends a high voltage signal as a non-connection signal that first lamp terminals 211 are disconnected from first circuit terminals 231.

Control means 31 has a transistor 341 whose base terminal is connected with intermediate point 339 and has a series circuit of a resistor 343 and a condenser 345 in parallel with the series resistors 331, 333 and 335. The emitter and the collector of transistor 341 are connected in parallel with condenser 345. Intermediate point 347, between resistor 343 and condenser 345, is connected with the base of a transistor 349 through a zener diode 351. Zener diode 351 permits voltage higher than a certain value is applied to it.

The emitter and the collector of transistor 349 are connected across a resistor 353 and the collector of transistor 349 is connected with an inverting amplifier circuit 355 through a resistor 357 and a diode 359. Diode 359 protects inverting amplifier circuit 355. Inverting amplifier circuit 355 generates a control signal for controlling driver 311 according to the electric potential of intermediate point 361 between resistor 357 and diode 359. In this embodiment, inverting amplifier circuit 355 generates the control signal so that the power supplied from high frequency circuit 23 decreases, e.g., stops, when the electric potential of intermediate point 361 is too high. Inverting amplifier circuit 355 and driver 311 can be made by using a voltage-frequency converter such as an integrated circuit TL 494 produced by Texas Instrument, Inc.

Resistors 353 and 357 are not only elements of the control means but also elements of the $V_L$ sensing means 33. A series circuit of resistors 353, 357 and 363 is provided in parallel to the lamp 21 and therefore, the electric potential changes according to the lamp voltage $V_L$. Second control means 35 is included in control means 31.

The following is the operation of the apparatus of this embodiment when lamp 21 is normally connected with the apparatus. When AC power source 317 is turned on, a direct current voltage, which has been rectified by rectifier 321 and smoothed by smoothing condenser 319, is supplied to high frequency circuit 23. Transistors 301 and 303 of high frequency circuit 23 are alternately switched ON and OFF by signals supplied from driver 311. Due to this switching, the series resonance circuit composed of condenser 305, inductor 307 and condenser 309 resonates and generates a high frequency power. Hot-cathodes 215 and 217 of lamp 21 are preheated by this high frequency power for a period. At the same time, this high frequency power is applied between hot-cathodes 215 and 217. After hot-cathodes 215 and 217 are pre-heated enough for starting, lamp 21 begins to discharge and lights.

In this case, the lamp is connected with high frequency circuit 23 and therefore, the electric potential of intermediate point 339 is almost zero. Thus, transistor 341 is turned off. As transistor 341 is turned off, condenser 345 is charged and the electric potential of intermediate point 347 is high. Then zener diode 351 passes current and transistor 349 is turned on. Since transistor 349 is turned on, the electric potential of intermediate point 361 is relatively low as compared with when transistor 349 is turned off. As a result, inverting amplifier circuit 355 generates a normal control signal so that high frequency circuit 23 supplies a normal high frequency power to lamp 21.

Next, the operation of the apparatus of this embodiment will be described when first lamp terminals 211 and first circuit terminals 231 are not connected with one another. In this case, a direct current is applied to the series circuit of resistors 331, 333 and 335 of sensing means 29. Therefore, the electric potential of intermediate point 339 increases and transistor 341 is turned on. As transistor 341 is turned on, condenser 345 is discharged and the electric potential of intermediate point 347 becomes low. Then zener diode 351 does not conduct and transistor 349 is turned off. Since transistor 349 is turned off, the electric potential of intermediate point 361 becomes relatively high as compared with when transistor 349 is turned on. As a result, inverting amplifier circuit 355 generates a control signal so that high frequency circuit 23 decreases, e.g., stops, high frequency power. Therefore, for instance, even if a person is still holding lamp 21, no leakage current, or only a very small leakage current, flows through the floating capacity and the person. Thus, the person will not receive a severe electric shock.

When first lamp terminals 211 are connected with first circuit terminals 231, but second lamp terminals 213 are disconnected from second circuit terminals 233, sensing means detects the connection between first lamp terminals 211 and first circuit terminals 231. Accordingly, high frequency circuit 23 operates as in the case that lamp 21 is normally connected with high frequency circuit 23. However, since a more stable and smaller potential is applied to the first circuit terminals 231 than second circuit terminals 233, no leakage current flows. Thus, the person does not receive a severe electric shock.

In this embodiment, the $V_L$ sensing means 33, comprising a series circuit of three resistors 353, 357 and 363 detects a lamp voltage $V_L$. When the lamp voltage $V_L$ is normal, the electric potential of intermediate point 361 is also normal. Since the inverting amplifier circuit 355 receives the signal having a normal electric potential of intermediate point 361, the high frequency circuit continues to work as usual.

However, when the lamp voltage $V_L$ becomes large, for instance at the end of the life of the lamp, the electric potential of intermediate point 361 becomes high. The inverting amplifier circuit 355 generates a control signal corresponding to the electric potential of intermediate point 361 so that high frequency circuit 23 stops or high frequency power decreases. As a result, parts of high frequency circuit 23 can be protected from damage.

Figure 3:
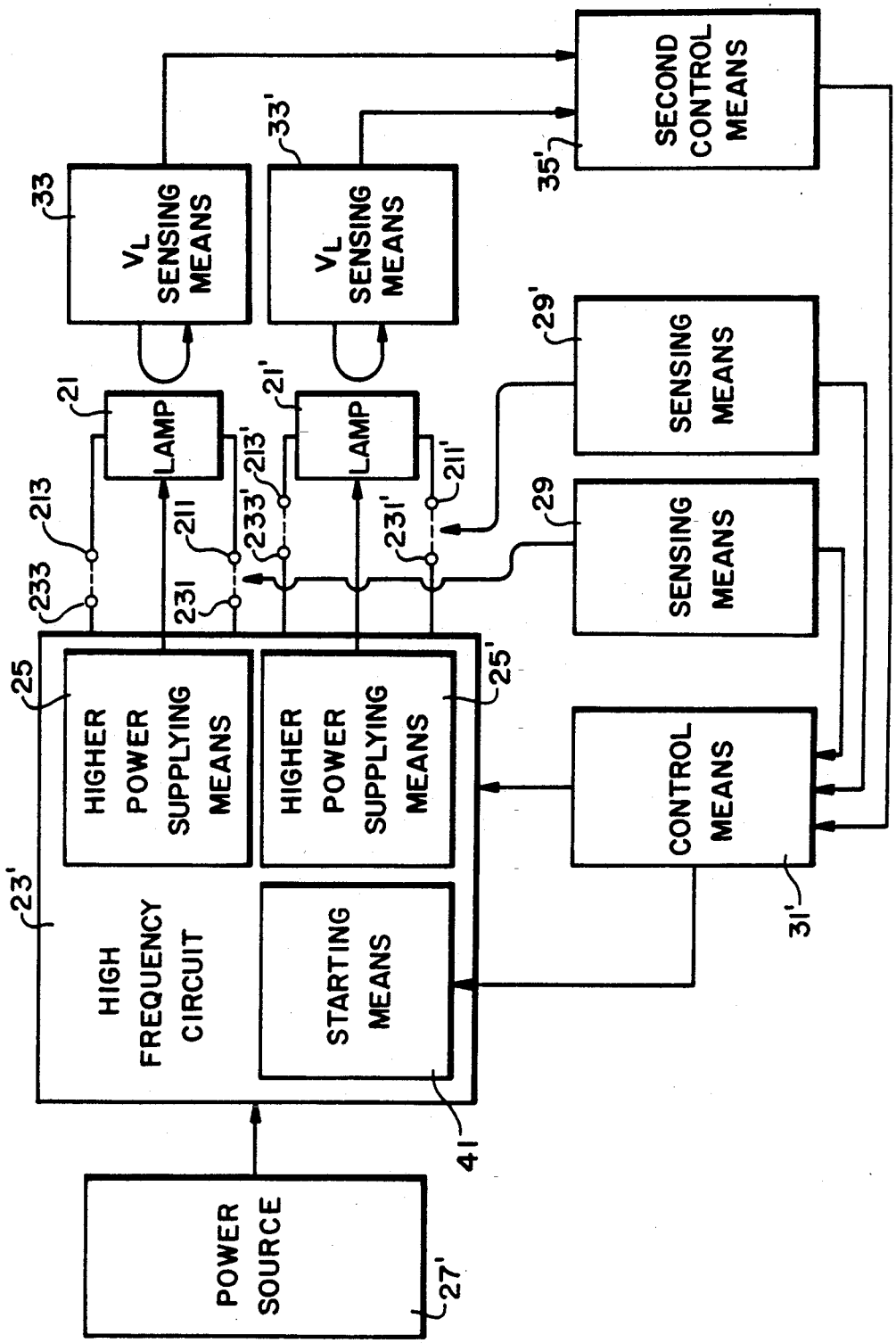
FIG. 3 is a block diagram of a second embodiment of the present invention.
Figure 4:
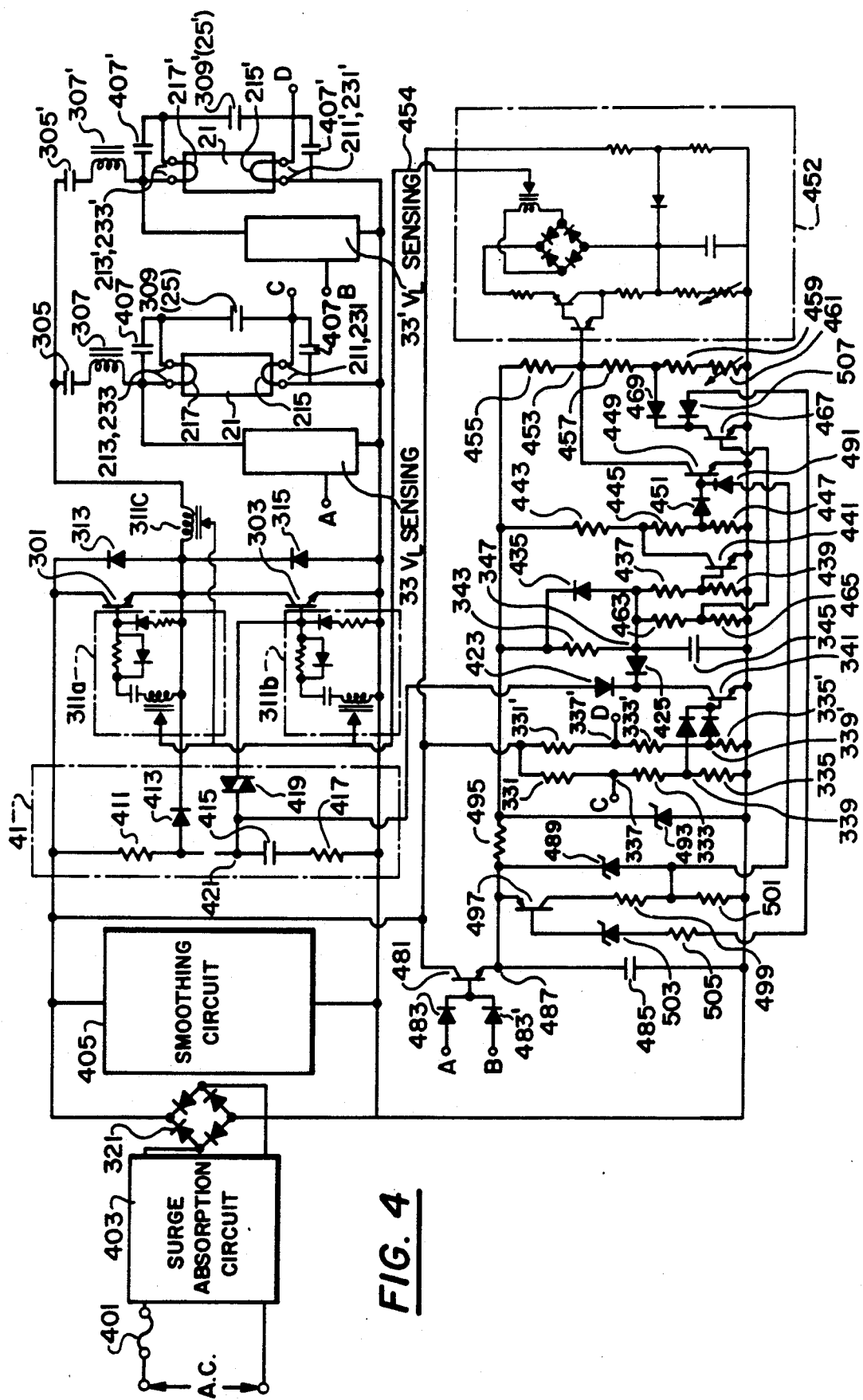
FIG. 4 is a circuit diagram of FIG. 3.

FIG. 3 and FIG. 4 show another apparatus according to a second embodiment of the present invention. The same reference numerals are associated with similar elements to that of the first embodiment throughout the explanation of the second embodiment. Further, descriptions of the same elements as the first embodiments have been omitted or shortened.

FIG. 3 is similar to FIG. 1 main difference between FIG. 1 and FIG. 3 is that there are two lamps, two higher power supplying mean, two sensing means and two $V_L$ sensing means in FIG. 3. The apparatus according to the second embodiment can operate two discharge lamps 21 and 21'. The number of first lamp terminals 211, first circuit terminals 231, second lamp terminals 213 and second circuit terminals 233 increases twice according to the number of lamps. High frequency circuit 23' starting means 41 for starting thereof.

The details of the block diagram of FIG. 3 are shown in FIG. 4. The power source 27' comprises a fuse 401 and a surge absorption circuit 403 between an AC power source (not shown) and a rectifier 321. A smoothing circuit 405 such as a condenser is connected with rectifier 321. A pair of drivers 311a and 311b are connected with base terminals of transistors 301 and 303 for driving transistors 301 and 303. The high frequency circuit has a current transformer 311c between transistors 301 and 303 and lamps 33 for controlling a current supplied to lamps 33. Drivers 311a and 311b current transformer 311c can be the same as driver 311 of FIG. 2.

Two lamps 21 and 21' are connected with the high frequency circuit and are electrically parallel to one another Each of hot-cathodes 215 and 217 and 215' and 217', of lamps 21 and 21', respectively, has a condenser 407 and 407' for constantly heating each of hot-cathodes 215 and 217 and 215' and 217', respectively.

Starting means 41 comprises condenser 415, resistors 411 and 417, a diode 413 and a switch device 419 such as a DIAC. Switch device 419 conducts when a voltage of more than certain value is applied. A series circuit composed of a resistor 411 and a diode 413 are connected between a collector and an emitter of the transistor 301. Resistor 411, condenser 415 and resistor 417 are connected in series with each other across rectifier 321. Switch device 419 is connected between driver 311b and an intermediate point 421. Intermediate point 421 is located between resistor 413 and condenser 415. Starter 41 causes the high frequency circuit to start due to a current flowing through switch device 419 after switch device 419 turns on.

One of the first circuit terminals 231 and 231' of each of lamps 21 and 21' respectively, is connected with sensing means 29 and 29', respectively. Each sensing means 29 and 29' comprises a series circuit of three resistors 331, 333 and 335 and resistors 331', 333' and 335', respectively. Resistors 331, 333 and 335, or 331', 333' and 335', work in the same way as in the first embodiment of FIG. 2. Each intermediate point 339 and 339' between the resistors 333 and 335 and 333' and 335', respectively, is connected with a base of a transistor 341 as same as in FIG. 2. The collector of transistor 341 is connected with intermediate point 421 through diode 423 to prevent switch device 419 from turning on while first lamp terminal 2il or 211' is not connected with first circuit terminals 231 or 231' and therefore, the electric potential of intermediate point 339 or 339' is high and transistor 341 is turned on. On the contrary, in a normal operation, transistor 341 is turned off and the electric potential of the collector of transistor 341 is high.

The collector of transistor 341 is connected with on intermediate point 347 between a resistor 343 and a condenser 345 in the same way as in FIG. 2. The series circuit of resistor 343 and condenser 345 work also in the same way as in FIG. 2. A diode 435 and two resistors 437 and 439 are connected in parallel with the series circuit of resistor 343 and condenser 345 for switching a transistor 441 according to the voltage of condenser 345. The base of transistor 441 is connected with an intermediate point between resistors 437 and 439. A series circuit of three resistors 443, 445 and 447 are connected in parallel with the series circuit of resistor 343 and condenser 345 for switching inversely a transistor 449 according to the transistor 441. Accordingly, a series circuit of resistors 445 and 447 are parallel connected with the collector and the emitter of transistor 441. The base of transistor 449 is connected with an intermediate point between resistors 445 and 497 through a diode 451. The collector of transistor 449 is connected with an amplifying control circuit 452. Accordingly, in a normal operation, in other words, when condenser 345 is charged, transistor 449 is turned off and the potential of intermediate point 453 between resistors 455 and 457 becomes high. The amplifying control circuit 452 generates positively a control signal corresponding to the potential of intermediate point 453 and sends control signal 454, such as a magnetic signal to drivers 311a and 311b. Resistors 459 and 461 tune the electric potential of intermediate point 453. The operation of amplifying control circuit 452 and drivers 311a and 311b is accomplished by using a well-known integrated circuit TL 494 produced by Texas Instrument, Inc. Amplifying control circuit 452 and drivers 311a and 311b are magnetically connected to each other. These circuits are well-known and accordingly the details are omitted.

A series circuit of resistors 463 and 465 is connected in parallel with the series circuit of resistors 437 and 439. Resistors 463 and 465 delay the time that a transistor 467 turns on until transistor 441 turns on and transistor 449 turns off. Therefore, the base of transistor 467 is connected with the intermediate point between resistors 463 and 465 and the collector of transistor 467 is connected with the intermediate point between resistors 457 and 459 through a diode 469. When transistor 467 turns on, the electric potential of intermediate point 453 becomes low.

Each of $V_L$ sensing means 33 and 33' is the same as in FIG. 2 and connected with a base of transistor 481 through diodes 483 and 483', respectively. The impedance of transistor 481 is inversely changed according to the lamp voltage $V_L$ of each lamp 21. The emitter and the collector of transistor 481 are parallel connected with rectifier 321 through a condenser 485 and therefore, the electric potential of intermediate point 487, between condenser 485 and the emitter of transistor 481, is positively changed according to the lamp voltage $V_L$. Intermediate point 487 and the base of transistor 449 are connected with one another through a zener diode 489 and a diode 491. Zener diode 489 conducts while the applied voltage is more than a threshold level. It turns on transistor 449 in order to reduce the high frequency power when the electric potential of intermediate point 487 is too high according to the voltage applied to lamp 21 or 21' from high frequency circuit 23 only for its starting period. It also turns off transistor 449 in order to increase the high frequency power when the electric potential of the intermediate point 487 is too low according to the voltage applied to lamp 21 or 21' for its starting period. As a result, the voltage applied to lamp 21 or 21' is kept at a certain level for its starting period.

Further a series circuit of a transistor 497 and resistors 499 and 501 is connected in parallel to condenser 485. The base of transistor 497 is connected with the collector of transistor 467 through a zener diode 503, a resistor 505 and a diode 507. After the starting period, transistor 497, zener diode 503 and resistor 505 stop the high frequency circuit or reduce the high frequency power when the lamp voltage $V_L$ is too high. It is necessary to change levels of the electric potential of intermediate point 487 which transistor 449 turns on according to whether the lamps are in their starting period or not.

A zener diode 493 is provided in parallel to the condenser 485 through a resistor 495 for protecting other circuit elements such as transistors 341, 441, 449 and 467 when an over voltage is applied.

The operation of this embodiment is described below. First, when both lamps 21 and 21' are connected with the apparatus. Hot-cathodes 215 and 215' are connected with first circuit terminals 231 and 231', respectively and therefore, the applied voltage to two pair of resistors 333 and 335 and resistors 333' and 351', which are equal to the voltage applied to hot-cathodes 215 and 215' are almost zero. Thus transistor 341 is turned off and condenser 345 is charged, in the same way as in the apparatus of FIG. 2. Accordingly, transistor 441 turns on, for example, after one second from the beginning of charge of condenser 345. Condenser 345 begins to charge when the power is supplied to the apparatus. In the same way, transistor 467 also turns on. However, the transistor 467 turns on, for example, 0.3–0.5 second after the transistor 441 turns on. The time relationships are determined by values of resistors 437, 439, 463 and 465 and so on. At the same time as transistor 441 turns on, transistor 449 turns off if zener diode 489 is turned off. Transistor 449 is kept on before turning off. When transistor 449 turns off, a current flowing into transistor 449 through resistor 455 begins to flow into resistor 457. Since the transistor 467 is kept off 0.3–0.5 second after the transistor 449 turns off, the current flowing into the resistor 457 flows into the resistors 459 and 461. Accordingly, the electric potential of intermediate point 453 changes to a high level from an almost zero level. The amplifying control circuit 452 changes the control signal supplied to drivers 331a and 331b so that the high frequency circuit begins to supply a high frequency power to lamps 21 and 21'. Lamps 21 and 21' begin to discharge by being supplied with the high frequency power.

The period from the beginning of supplying AC power to the changing of the control signal is a soft start period. During this period, AC current is supplied to preheat hot-cathodes 215 and 217 and 215' and 217' of each lamp 21 and 21', respectively, through resistor 411 and diode 413. During 0.3–0.5 second after the end of the soft start period, high voltage power is applied to the lamps. But transistor 467 is still turned off and therefore, diode 503 is turned off. Accordingly, transistor 467 is kept off. However, zener diode 493 switches according to the lamp voltage $V_L$ during this period. When the lamp voltage $V_L$ is to high, diode 493 is turned on and when the lamp voltage $V_L$ is low, diode 493 is turned off. Accordingly, the lamp voltage $V_L$ is kept at a certain level.

After 0.3–0.5 seconds from the end of the soft start period, transistor 467 turns on and therefore, the current flowing into resistors 459 and 461 begins to flow into transistor 467. Accordingly, the electric potential of intermediate point 453 changes to a low level from a high level. The amplifying control circuit 452 changes the control signal supplied to drivers 331a and 331b so that the high frequency power supplied to lamps 21 and 21' from the high frequency circuit becomes low. The period of 0.3-0.5 seconds after the soft start period is provided for the beginning of the discharge of lamps 21 and 21'. It is enough to supply the high frequency power of a high level only during the period of 0.3-0.5 seconds.

When first lamp terminal 211 or 211' of lamp 21 or 21' are disconnected from the first circuit terminals 231 or 231', the electric potential of intermediate point 337 or 337' (point C or D) is high and therefore, transistor 341 is turned on. This creates a non-operation signal. Accordingly, the electric potential of intermediate point 421 is low and switch device 419 does not turn on. As a result, the high frequency circuit does not work and does not generate the high frequency power.

When first lamp terminals 211 or 211' of lamp 21 or 21' are disconnected from first circuit terminals 231 or 231' after lamp 21 or 21' begin to discharge, the electric potential of the intermediate point 337 low level. Therefore, transistor 341 turns on and condenser 345 discharges. Then transistor 441 turns off and transistor 449 turns on. Accordingly, the electric potential of intermediate point 453 changes to a level of almost zero. Amplifying control circuit 452 changes the control signal supplied to drivers 331a and 331b so that the high frequency circuit stops or decreases the high frequency power to lamps 21 and 21'.

When the lamp voltage $V_L$ of lamp 21 or 21' increases because of the end of its life, the electric potential of the terminal point A or B, which is connected to the base of transistor 481 becomes high. Therefore, the impedance of transistor 481 decreases and the electric potential of the terminal point 487 increases. Thus zener diode 489 turns on and transistor 449 turns on. Accordingly, the electric potential of the intermediate point 453 changes to a level of almost zero. Amplifying control circuit 452 changes the control signal supplied to drivers 331a and 331b so that the high frequency circuit stops or decreases the high frequency power to lamps 21 and 21'.

Figure 5:
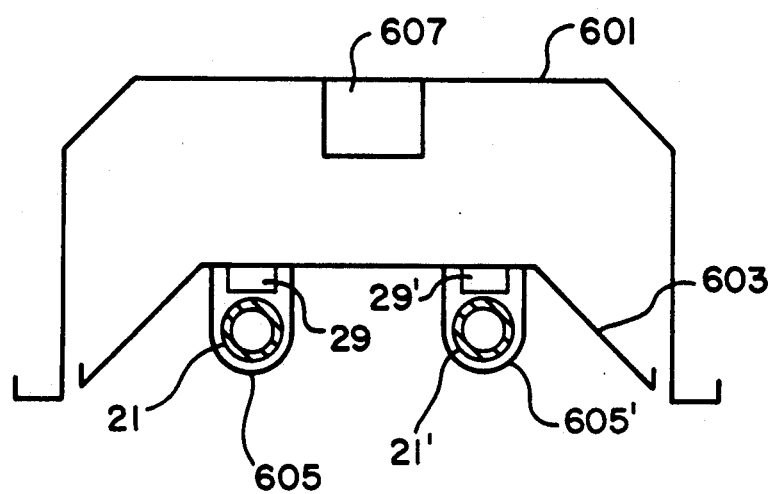
FIG. 5 is a cross-sectional view of a principal part of a lighting fixture having the apparatus of FIGS. 3 and 4.

Many kinds of lighting fixtures can be equipped with the apparatus described above in many ways. FIG. 5 shows a cross sectional view of a principal part of a lighting fixture having the apparatus described above and shown in FIGS. 3 and 4. FIG. 5 shows one side of the lighting fixture. The lighting fixture of FIG. 5 is a so-called "flush-type" light fitting and is well-known. Accordingly, FIG. 5 is simplified by omitting elements which are not important.

A main body 601 of the lighting fixture has a reflector plate 603. The reflector plate 603 mounts two pair of sockets 605 and 605' thereon for fixing two lamps 21 and 21'. Lamps 21 and 21' are especially a 40 watt straight type. Two sensing means 29 and 29' described above, are fixed to sockets 605 and 605', respectively. Almost all elements 607 other than sensing means 29 and 29' are fixed to main body 601.

Figure 6:
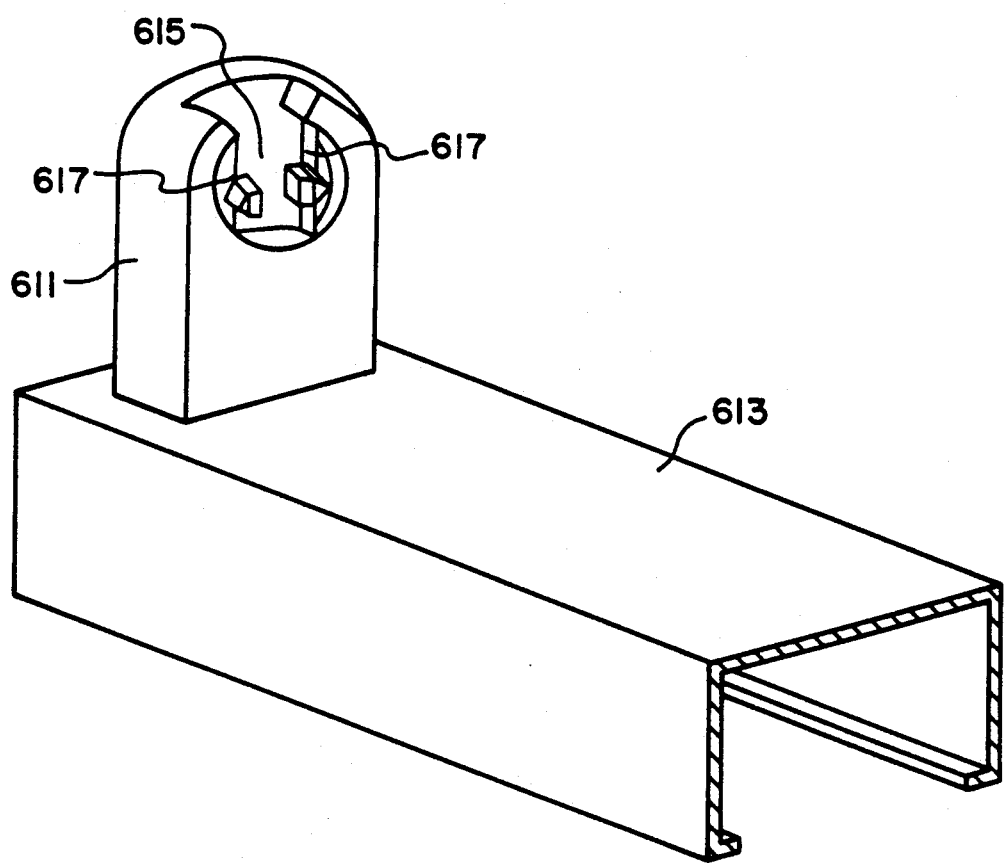
FIG. 6 is a perspective view of a principal part of another type of lighting fixture having the apparatus of FIGS. 1 and 2.

FIG. 6 shows a principal perspective view of a socket 611 and a socket base 613 which are fixed to another type of a lighting fixture having the apparatus described above and shown FIGS. 1 and 2. Socket 611 is a "rotating" type socket and is well-known. Socket 611, mounted on socket base 613 has a guide recess 617 and a pair of first circuit terminals 231 or a pair of the second circuit terminals 233 at both sides of recess 615. Lamp 21 is a straight type fluorescent lamp and accordingly, a pair of the first lamp terminals 211 and a pair of the second lamp terminals 213 of the lamp 21 are respectively formed into pins which extend parallel to the axis of lamp 21. Each pair of pins is located at each end of lamp 21.

The pins of fluorescent lamp 21 are inserted into the guide recess 615 at each socket 611 and then the lamp is rotated. When lamp 21 is rotated, the pins also rotate into contact with first circuit terminals 231 or second circuit terminals 233 at opposite sides of the recess 615. Because the pins at only one side of lamp 21 cannot be fixed to socket 611, the lighting fixture of FIG. 6 has an advantage that, even if sensing means 29 is provided only at one side of lamp 21, the reliability for sensing the connection or non-connection between the lamp and the circuit is equal to that of the lighting fixture having sensing means at both sides of the lamp.

The present invention is not limited to the embodiments described above. The high frequency circuit may be a single transistor invertor. The control means may control a high frequency power by stopping or reducing an input voltage supplied to the high frequency circuit instead of controlling a high frequency power by controlling its frequency. Further it is possible to control a high frequency power at an output side instead of controlling at an input side. The lamp is not limited to a fluorescent lamp having a pair of hot-cathodes and may be a lamp having a cold-cathode. Further, in the embodiment described above, a minus terminal of the rectifier is more stable in electric potential than a plus terminal of the rectifier. However, it is possible that the plus terminal is more stable than the minus terminal. In that case, the sensing means is required to be provided at the side of the plus terminal.

The present invention has been described with respect to specific embodiments. However, other embodiments based on the principles of the present invention should be obvious to those of ordinary skill in the art. Such embodiments are intended to be covered by the claims.

What is claimed is:

1. An apparatus for operating a plurality of discharge lamps having a pair of lamp terminals respectively, comprising:
  a high frequency circuit having a plurality of sets of first circuit terminals and second circuit terminals adapted to be connected with said lamp terminals, respectively, said high frequency circuit supplying high frequency power to said lamps through said sets of first and second circuit terminals, the amplitude of the electric potential of the high frequency power applied to each of said first circuit terminals being less than that applied to each of said second circuit terminals, respectively;
  a plurality of sensing means, one corresponding to each set of first circuit terminals and said lamp terminals, for sensing the absence of an electrical connection between each set of first circuit terminals and said lamp terminals, and for generating each non-connection signal, respectively; and
  control means for receiving each non-connection signal and for sending a decrease control signal to said high frequency circuit for decreasing said high frequency power supplied to said second circuit terminals in response to receiving at least one of said non-connection signals.

2. The apparatus according to claim 1, wherein said high frequency circuit means further comprises higher power means, associated with each lamp, for supplying a higher power to an associated lamp during a starting period of said lamp.

3. The apparatus according to claim 1, wherein said high frequency circuit means further comprises starting means, connected with said control means, for starting said high frequency circuit means at a starting period of at least one lamp being started; and wherein said control means sends a non-operation signal to said starting means in response to a non-connection signal corresponding to said lamp being started so that said starting means does not work.

4. The apparatus according to claim 1, further comprising:
a plurality of $V_L$ sensing means, associated with each lamp, for sensing an increase of the lamp voltage of an associated lamp and for generating a lamp voltage increase signal; and
second control means for receiving said lamp voltage increase signals and for sending said decrease control signal to said high frequency circuit means for decreasing said high frequency power according to receiving said lamp voltage increase signals.

5. The apparatus according to claim 4, wherein said second control means is connected electrically between said control means and said plurality of $V_L$ sensing means and sends said decrease control signal to said high frequency circuit means through said control means.

6. The apparatus according to claim 1, wherein said control means further comprises soft start means for generating a signal the same as said decrease control signal for supplying a lower power to each lamp for a predetermined period before supplying an ordinary power to each lamp.

7. The apparatus according to claim 1, further comprising a rectifier connected to an input of said high frequency circuit means and having a plus terminal and a minus terminal, and wherein electric potentials of said sets of first circuit terminals are nearer to that of said minus terminal than that of said plus terminal.

8. The apparatus according to claim 7, wherein said sets of first circuit terminals are electrically connected with said minus terminal.

9. The apparatus according to claim 1, further comprising starting means located electrically between said high frequency circuit and said control means for starting said high frequency circuit at a starting period of said lamps and wherein said control means sends a non-operational signal to said starting means in response to at least one of said non-connection signals so that said starting means does not work.

10. A lighting unit, comprising:
a plurality of discharge lamps, each having a pair of lamp terminals;
a high frequency circuit having a plurality of sets of first circuit terminals and second circuit terminals adapted to be connected with said lamp terminals, respectively, said high frequency circuit supplying a high frequency power to said lamps through said sets of first and second circuit terminals, the amplitude of the electric potential of the high frequency power applied to said first circuit terminals being less than that applied to said second circuit terminals, respectively;
a plurality of sensing means, one corresponding to each set of first circuit terminals and said lamp terminals, for sensing the absence of an electrical connection between each set of first circuit terminals and said lamp terminals, and for generating each non-connection signal, respectively; and
control means for receiving each non-connection signal and for sending a decrease control signal to said high frequency circuit for decreasing said high frequency power supplied to said second circuit terminals in response to receiving at least one of said non-connection signals.

11. The lighting unit according to claim 10, further comprising a body mounting said discharge lamps, said high frequency circuit, said sensing means and said control means.

12. The lighting unit according to claim 11, wherein said lamps are fluorescent lamps which have a straight configuration having an axis; each of said lamp terminals has a pair of pins extending parallel to said axis of said lamp and are located at each end of said lamp, respectively, and said body comprises a pair of rotatable type sockets connected with said sets of first and second circuit terminals, and adapted to receive said pins of each lamp.

* * * * *